United States Patent
Iwasawa et al.

(10) Patent No.: US 11,477,121 B2
(45) Date of Patent: Oct. 18, 2022

(54) PACKET TRANSFER APPARATUS, METHOD, AND PROGRAM

(71) Applicant: Nippon Telegraph and Telephone Corporation, Tokyo (JP)

(72) Inventors: Hiroki Iwasawa, Musashino (JP); Kazuhiro Tokunaga, Musashino (JP); Shinya Tamaki, Musashino (JP); Takeshi Kuwahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/261,917

(22) PCT Filed: Jul. 26, 2019

(86) PCT No.: PCT/JP2019/029437
§ 371 (c)(1),
(2) Date: Jan. 21, 2021

(87) PCT Pub. No.: WO2020/026983
PCT Pub. Date: Feb. 6, 2020

(65) Prior Publication Data
US 2021/0314267 A1 Oct. 7, 2021

(30) Foreign Application Priority Data

Jul. 31, 2018 (JP) .............................. JP2018-143193

(51) Int. Cl.
*H04L 47/215* (2022.01)
*H04L 47/2441* (2022.01)
(Continued)

(52) U.S. Cl.
CPC ........ *H04L 47/215* (2013.01); *H04L 47/2441* (2013.01); *H04L 47/527* (2013.01); *H04L 47/6215* (2013.01)

(58) Field of Classification Search
CPC . H04L 47/215; H04L 47/2441; H04L 47/527; H04L 47/6215
See application file for complete search history.

(56) References Cited

U.S. PATENT DOCUMENTS

2002/0036984 A1* 3/2002 Chiussi ............... H04L 12/5602
370/232
2003/0202517 A1* 10/2003 Kobayakawa .......... H04L 47/24
370/395.4

(Continued)

OTHER PUBLICATIONS

[No Author Listed], "Diffserv—The Scalable End-To-End Quality of Service Model," Cisco Systems, Aug. 2005, 19 pages.

(Continued)

*Primary Examiner* — Kibrom T Hailu
(74) *Attorney, Agent, or Firm* — Fish & Richardson P.C.

(57) ABSTRACT

A packet transfer apparatus is configured to perform packet exchange processing for exchanging multiple continuous packets with low delay while maintaining fairness between communication flows of the same priority level. The packet transfer apparatus includes: a packet classification unit; queues that holds the classified packets for each classification; and a dequeue processing unit that extracts packets from the queues. The dequeue processing unit includes a scheduling unit that controls the packet extraction amount extracted from the queue for a specific communication flow based on information on the amount of data that is requested by the communication flow and is to be continuously transmitted in packets.

20 Claims, 8 Drawing Sheets

(51) Int. Cl.
*H04L 47/52* (2022.01)
*H04L 47/62* (2022.01)

(56) References Cited

U.S. PATENT DOCUMENTS

| | | | | |
|---|---|---|---|---|
| 2007/0121504 A1* | 5/2007 | Hellenthal | .............. | H04L 47/36 |
| | | | | 370/230 |
| 2007/0223375 A1* | 9/2007 | Ohta | ..................... | H04L 47/215 |
| | | | | 370/230 |
| 2011/0002345 A1* | 1/2011 | Bian | ..................... | H04L 49/901 |
| | | | | 370/462 |
| 2020/0274831 A1* | 8/2020 | Wei | ........................ | H04L 47/56 |

OTHER PUBLICATIONS

Demers et al., "Analysis and Simulation of a Fair Queueing Algorithm," SIG COMM, 1989, 19(4):1-12.
Elbamby et al., "Towards Low-Latency and Ultra-Reliable Virtual Reality," IEEE Network, 2018, vol. 32, 8 pages.
Hoeiland-Joergensen et al., "The Flow Queue CoDel Packet Scheduler and Active Queue Management Algorithm," Internet Engineering Task Force (IETF), Jan. 2018, 25 pages.
Nichols et al., "Controlled Delay Active Queue Management," Internet Engineering Task Force (IETF), Jan. 2018, 25 pages.
Pan et al., "Proportional Integral Controller Enhanced (PIE): A Lightweight Control Scheme to Address the Bufferbloat Problem," Internet Engineering Task Force (IETF), Feb. 2017, 30 pages.

* cited by examiner

Fig. 5

| QUEUE | 5tuple HASH VALUE | TOKENS | BURST FLAG | BURST VALUE |
|---|---|---|---|---|
| QUEUE 1 | 51bff1afb8d6db3fa671bf933d7f0674<br>11cfd63ffa62e99dcbce9b17b0d908a2 | 16698 | 1 | 16698 |
| QUEUE 2 | e776b2ab50662ead805920b285c3c9c2<br>42d672348f759674c319a4de88d85c03 | 3036 | 0 | 0 |
| QUEUE 3 | 7a90d32bb53ca01aa15757c03aef30ae<br>1f3d3a97af93a0a4d77f7487e03698e0 | 3036 | 0 | 0 |
| QUEUE 4 | 4eeafed43128755e77355fee088f4078<br>eb4fbe964cb6ce57c6a20d7a23fb7c7e | -22770 | 0 | 0 |
| ⋮ | ⋮ | ⋮ | ⋮ | ⋮ |

PACKET TRANSFER APPARATUS, METHOD, AND PROGRAM

CROSS-REFERENCE TO RELATED APPLICATIONS

This application is a National Stage application under 35 U.S.C. § 371 of International Application No. PCT/JP2019/029437, having an International Filing Date of Jul. 26, 2019, which claims priority to Japanese Application Serial No. 2018-143193, filed on Jul. 31, 2018. The disclosure of the prior application is considered part of the disclosure of this application, and is incorporated in its entirety into this application.

TECHNICAL FIELD

The present invention relates to a packet transfer apparatus for transferring packets received from an external apparatus.

BACKGROUND ART

A packet transfer apparatus generally includes a packet classification unit that classifies received packets, queues that hold the classified packets for each classification, and a packet extraction unit for extracting packets from the queues.

The simplest queuing method is FIFO (First In, First Out), in which packets are placed in one queue in the order in which they arrive, and are transmitted in the order in which they arrived. Methods such as CoDel (Controlled Delay) in which a packet discard probability is increased accompanying an increase in queuing delay (see NPL 1), and PIE (Proportional Integral Controller Enhanced) (see NPL 2) have been proposed as methods for solving the increase in the queuing delay in FIFO.

Also, FQ (Fair Queuing) (see NPL 3) is known as a queuing method in which communication flows are treated fairly. In FQ, queues are allotted for each communication flow, and the packets are evenly transmitted from each queue. A token bucket algorithm is one implementation of FQ. In the token bucket algorithm, tokens are added to each queue in intervals of a certain amount of time, and an amount of packets corresponding to the amount of tokens can be transmitted at the packet transmission timing of each queue. By using tokens, packet transmission in bursts is allowed to some extent, and the network bandwidth can be used efficiently. A method called FQ_CoDel (Flow Queue-CoDel) (see NPL 4) in which it is possible to achieve fairness between flows and reduce queuing delay by combining FQ and CoDel has also been proposed.

Also, DiffServ (Differentiated Services) (see NPL 5) is known as a typical method for guaranteeing QoS (quality of service) in Internet communication. DiffServ is a method in which a communication flow is classified into several classes, and control is performed by applying a priority ranking to each class. Examples of prioritized control methods include FQ (Priority Queuing), WFQ (Weighted Fair Queuing), and LLQ (Low Latency Queuing). These methods attempt to guarantee QoS by performing processing or band guaranteeing with priority given to the packet of a class with a high priority level.

Incidentally, in recent years, VR/AR (Virtual Reality/Augmented Reality) has become increasingly widespread. In recent years, it has become easy to experience VR by mounting a mobile SoC (System on a Chip) on an HMD (Head Mounted Display) or by mounting a smartphone on HMD-type goggles, but the rendering performance and quality of the experience is inferior to that of a high-end HMD using the most, recent GPU (Graphics Processing Unit), which is expensive. In view of this, there is a possibility that a high-end VR experience can be easily achieved by sending an image rendered by a GPU in a data center at a remote location to a lightweight terminal such as a smartphone. It is known that VR of a type in which an HMD is mounted causes a symptom called "VR sickness" caused by misalignment between gaps between people and the image, but it is said that suppressing the amount or time for a person's movement to be reflected in the image of the HMD (Motion to Photon latency) to at most 20 ms or less is effective as one method for avoiding VR sickness (see NPL 6).

CITATION LIST

Non Patent Literature

[NPL 1] K. Nichols et al., "Controlled Delay Active Queue Management", IETF RFC 8299, January 2018, [online], [searched for on Jul. 6, 2016], Internet <URL: https://tools.ietf.org/html/rfc8289>

[NPL 2] R. Pan et al., "Proportional Integral Controller Enhanced (PIE): A Lightweight Control Scheme to Address the Bufferbloat Problem", IETF RFC 8033, February 2017, [online], [searched for on Jul. 6, 2018], Internet <URL: https://tools.ietf.org/html/rfc8033#ref-HPSR-PIE>

[NPL 3] A. Demers, S. Keshav, and S. Shenker, "Analysis and simulation of a fair queueing algorithm", in Proc. SIGCOMM'89, vol. 19, no. 4, pp. 1-12, Septemeber 1989, [online], [searched for on Jul. 8, 2018], Internet <URL: https://dl.acm.org/citation.cfm?id=75248>

[NPL 4] T. Hoeiland-Joergensen et al., "The FlowQueue-CoDel Packet Scheduler and Active Queue Management Algorithm", IETF RFC 8290, January 2018, [online], [searched for on Jul. 6, 2018], Internet <URL: https://tools.ietf.org/html/rfc8290>[NPL 5] cisco systems, "DIFFSERV—THE SCALABLE END-TO-END QUALITY OF SERVICE MODEL", 2005, [online], [searched for on Jul. 6, 2013], Internet <URL: http://www.cisco.com/en/US/technologies/tk543/tk766/technologies_white_paper09186a00800a3e2f.pdf>

[NPL 6] Mohammed S. Elbamby, Cristina Perfecto, Mehdi Bennis, Klaus Doppler, "Towards Low-Latency and Ultra-Reliable Virtual Reality", IEEE Network, Vol. 32, pp. 37-84, April 2013

SUMMARY OF THE INVENTION

Technical Problem

When a VR image rendered at a data center at a remote location is transferred in IP (Internet Protocol) packets with an MTU (Maximum Transmission Unit) of 1500 bytes, in a high-resolution image that is full HD (High Definition) or higher, one frame of the image is formed of several tens to several hundreds of packets, and therefore the transfer of all of the several tens to several hundreds of packets forming one frame needs to be completed in an amount of time obtained by subtracting the processing delay for rendering, encoding, decoding, and the like from 20 ms.

Since CoDel and PIE reduce the queuing delay by discarding packets, they can incur block noise and the like due to packet loss in real-time image transfer. Also, although it is possible to reduce the queuing delay per packet, reduction of the transfer delay for all continuous packets is not guaranteed.

In the case of performing fair queuing, such as FQ or FQ_CoDel, the packets for each flow are transferred fairly, little by little. For this reason, even if no convergence that compresses the line bandwidth occurs, when a packet of another flow arrives while several tens of packets such as those of one frame of the image are being transferred, a queuing delay occurs. For example, with a 10-Gbps line, a 1500-byte packet transfer delay is 1.2 us, but if 100 flows are processed sequentially one packet at time, a 120-us transfer delay occurs for each packet, and therefore a delay of 6 ms will occur in the transfer of all 50 packets, for example.

Although it is also conceivable that bandwidth is reserved using PQ or the like, it is necessary to instantaneously occupy 6% of the 10-Gbps line in order to transfer 50 packets in 1 ms, and thus if there is a lot of priority communication, it is difficult to reserve bandwidth for all of the users. In the case where bandwidth is reserved and priority control is performed, if multiple communications are performed at the same time at the same priority level, there is a possibility that a queuing delay similar to that in FQ will occur.

The present invention has been made in view of the foregoing circumstances and provides a packet transfer apparatus, a method, and a program for performing packet transfer processing for transferring multiple continuous packets with low delay while maintaining fairness between communication flows of the same priority level.

Means for Solving the Problem

In order to achieve the above-described object, the invention of the present application is a packet transfer apparatus for transmitting received packets to an external apparatus, the packet transfer apparatus including a packet classification unit configured to classify received packets, queues for holding the classified packets for each classification, and a dequeue processing unit configured to extract packets from the queues. The dequeue processing unit includes a scheduling unit configured to control a packet extraction amount extracted from the queue for a specific communication flow based on information on an amount of data that is requested by the communication flow and is to be continuously transmitted in packets.

Also, in the invention of the present application, furthermore the scheduling unit restricts the packet extraction amount in the communication flow based on the amount of data that was continuously transmitted after the continuous transmission of the packets performed through the control of the packet extraction amount.

Also, in the invention of the present application, furthermore, the scheduling unit calculates the maximum value of the amount of data that can be continuously transmitted based on the amount of data that the packet transfer apparatus can transmit to an external apparatus and the number of communication flows using the packet transfer apparatus, and controls the packet extraction amount extracted from the queue in a range of the maximum value.

Effects of the Invention

According to the present invention, the scheduling unit controls the packet extraction amount extracted from the queue for a specific communication flow based on information on the amount of data that is requested by the communication flow and is to be continuously transmitted in packets. Therefore, it is possible to perform packet transfer corresponding to a characteristic such as the transmission timing or transmission amount of packets included in the communication flow.

Also, according to the present invention, by restricting packet transmission after performing instantaneous burst transmission, it is possible to perform transfer all of the data spanning over multiple packets, such as one frame of a real-time image, with reduced queuing delay without hindering packet transmission of other communication.

Also, according to the present invention, it is possible to reduce the maximum queuing delay and jitter resulting from burst transmission by calculating the maximum value of the transmit table burst amount based on the packet transmission amount and the number of active flows.

BRIEF DESCRIPTION OF DRAWINGS

FIG. 3 shows an example of queue state management in a scheduler.

DESCRIPTION OF EMBODIMENTS

Figure 1:
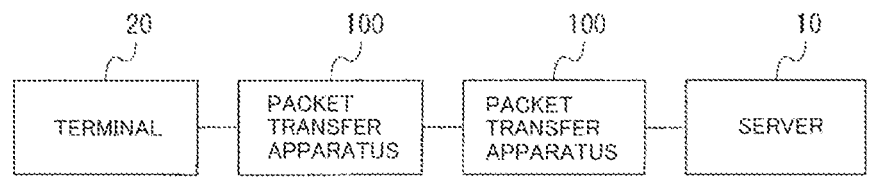
FIG. 1 is a diagram showing an overall configuration of a communication system according to an embodiment.

A communication system according to one embodiment of the present invention will be described with reference to the drawings. FIG. 1 shows an overall configuration of a communication system according to the present embodiment.

As shown in FIG. 1, in a communication system according to the present embodiment, a server 10 and a terminal 20 perform communication via multiple packet transfer apparatuses 100. The communication system is not limi:ed to the configuration shown in FIG. 1, and need only be a configuration in which communication terminals such as the server 10 and the terminal 20 are connected for communication via a packet transfer apparatus 100.

The packet transfer apparatus 10 is mainly constituted by a semiconductor apparatus, and can be constituted as a so-called information processing device that includes volatile storage apparatuses such as a CPU (Central Processing Unit) or a RAM (Random Access Memory), non-volatile storage apparatuses such as a hard disk or a flash memory, and a communication interface that performs connection for communicating with an external apparatus. Also, the packet transfer apparatus 100 is not limited to a network device such as a physical switch or a router, and includes a physical computer or a virtual computer on which a packet transfer program of the present invention operates.

The packet transfer apparatus 100 according to the present invention performs scheduling for controlling the packet extraction amount extracted from the queue for a specific communication flow based on information on the amount of data that is required by that communication flow and is to be continuously transmitted in packets. That is, scheduling is controlled such that it is possible to continuously extract packets for a specific communication flow based on information on the amount of data requested by that communication flow and that is to be continuously transmitted as packets. This kind of control can be realised by increasing the amount of tokens for the communication flow if, for example, a token bucket algorithm is used as the queuing algorithm.

Also, after continuous transmission through control, of the packet extraction amount, the packet transfer apparatus 100 according to the present invention restricts the packet extraction amount in the communication flow based on the amount of data that was continuously transmitted. Accordingly, no data transmission opportunity of another communication flow is hindered. Here, examples of restriction of the packet extraction amount include not performing extraction of packets from a queue for the communication flow, reducing the frequency of extraction of packets from a queue for the communication flow, and reducing the priority level, class, or the like for packets extracted from a queue for the communication flow. For example, if a token bucket algorithm is used as the queuing algorithm, restriction can be performed by reducing the number of tokens for the communication flow, and in particular can be performed by reducing the number of tokens to a negative value.

Also, the packet transfer apparatus 100 according to the present invention calculates the maximum value of the amount of data that can be continuously transmitted, which is calculated based on the number of communication flows that use the packet transfer apparatus 100, and that can be transmitted by the packet transfer apparatus 100 to an external, apparatus, and controls the packet extraction amount extracted from the queue within the range of the maximum value. Accordingly, it is possible to suppress the data transmission interval (maximum queuing delay) to within a certain value, even if multiple communication flows continuously transmit the data.

Hereinafter, the present invention will be described using an example in which packets are transmitted from the server 10 to the terminal 20. Note that in the following description, continuously transmitting a packet based on the above-described packet extraction control according to the present invention will be referred to as "burst transmission". Also, requesting implementation of burst transmission will be referred to as a "burst request". A method in which the packet transfer apparatus 100 is notified of this burst request will be described later.

Figure 2:
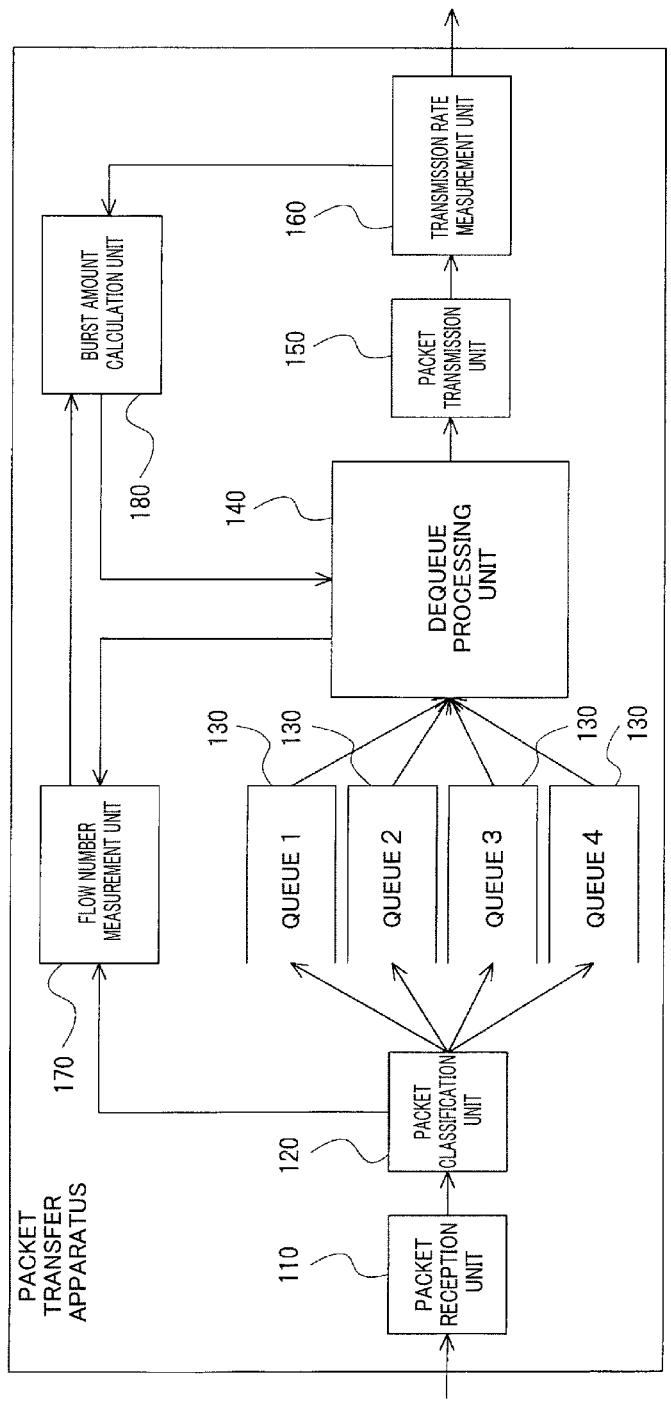
FIG. 2 is a functional block diagram of a packet transfer apparatus.

FIG. 2 shows a functional block diagram of the packet transfer apparatus of the present embodiment. The packet transfer apparatus 100 includes a packet reception unit 110, a packet classification unit 120, multiple queues 130, a dequeue processing unit 140, a packet transmission unit 150, a transmission rate measurement unit 160, a flow number measurement unit 170, and a burst amount calculation unit 180. The packet, reception unit 110 receives packets from an external server, terminal, other packet transfer apparatus, or the like. The packet classification unit 120 classifies the received packets into flows or classes. The multiple queues 130 temporarily store the packets allocated by the packet classification unit 120. The dequeue processing unit 140 extracts packets from the fronts of the queues 130. The packet transmission unit 150 transmits the extracted packets to an external apparatus. The transmission rate measurement unit 160 measures the flow rate of the packets transmitted from the packet transmission unit 150. The flow number measurement unit 170 measures the number of communication flows (active flows) that are currently using the packet transfer apparatus 100 by acquiring information from the packet classification unit 120 and the dequeue processing unit 140. The burst amount calculation unit 180 acquires information from the flow number measurement unit 170 and the transmission rate measurement unit 160, and calculates the upper limit value (burst amount upper limit value) of packets that can be transmitted at once.

Here, "communication flow" indicates a group of packets with the same 5tuple, which is composed of the transmission/reception IP addresses, the transmission/reception ports, and the protocol number, or the same combination of information on any of the transmission/reception IP addresses, the transmission/reception ports, and the protocol number.

Figure 3:
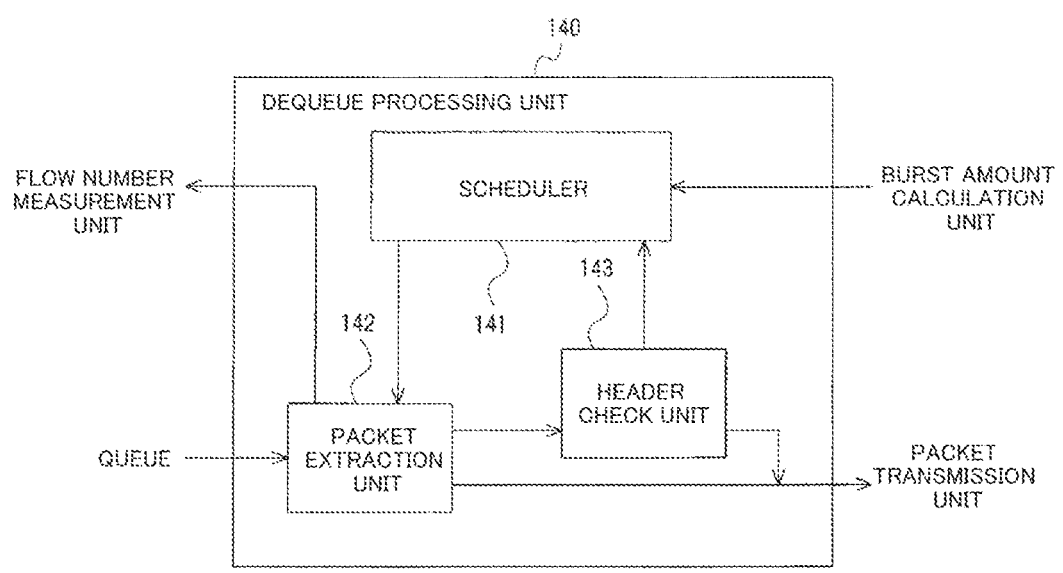
FIG. 3 is a functional block diagram of a dequeue processing unit.

FIG. 3 shows a functional block diagram of the dequeue processing unit 140. The dequeue processing unit 140 includes a scheduler 141 that performs state management of the queues 130, determines how many packets are to be transmitted from each queue 130, and instructs the determination result to the packet extraction unit, a packet extraction unit 142 that extracts packets from the queues 130 according to the instruction from the scheduler 141, and a header check unit 143 that checks whether or not there is a burst transmission request in the header of an extracted packet.

The packet extraction unit 142 notifies the flow number measurement unit 170 of the number of packets that were extracted from each queue 130. The scheduler 141 reflects the burst amount upper limit value acquired from the burst amount calculation unit 180 in the scheduling. The packet extraction unit 142 sends the packets extracted from the queues 130 according to the instruction of the scheduler 141 to the header check unit 143 or the packet transmission unit 150. Also, the packets checked by the header check unit 143 are sent to the packet transmission unit 150.

Hereinafter, an example will be described in which the packet classification unit 120 prepares a queue 130 for each flow by classifying using hash values (5tuple hash values) calculated based on the 5tuple values, and in the scheduler 141 of the dequeue processing unit 140, scheduling based on a deficit round robin using a token bucket algorithm is performed. Also, it is assumed that a request to implement burst transmission is performed by storing a burst value, which is the amount of data that is to be continuously transmitted in packets by the server 10.

Note that the present invention can be used in a method in which packets are classified into the same class, as well as in a method of classifying packets into multiple classes with different priority levels instead of classifying using 5tuple, a method of classifying packets into classes for each network condition, such as delay, throughput, and packet loss, a method of classifying packets into some sort of class and then further classifying the packets in the class by flow or class, or the like as the packet classification method.

In addition to a deficit round robin, it is also possible to use simple FIFO, bandwidth reservation for a specific class or flow, or priority control for scheduling as well.

Figure 4:
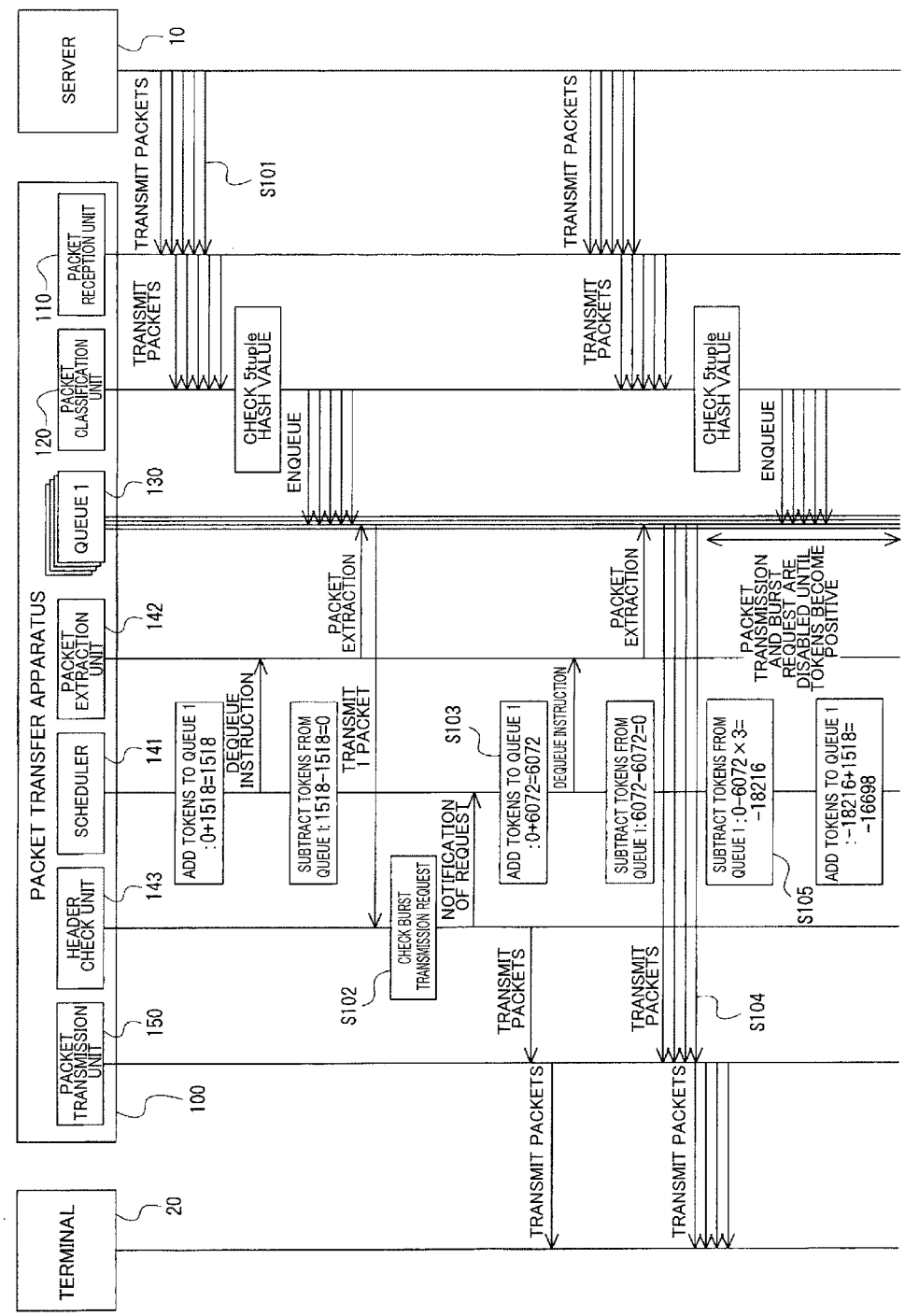
FIG. 4 shows an example of a sequence chart of a queuing processing procedure.

Next, an example of a procedure for implementing the present invention will be described with reference to FIG. 4. As shown in FIG. 4, upon reaching the packet reception unit 110, the packets are allocated by the packet classification unit 120 to the queues 130 according to the 5tuple hash values.

The packets are extracted from the respective queues 130 by the packet extraction unit 142 in the dequeue processing unit 140 based on deficit round robin control using the token bucket algorithm of the scheduler 141. In the deficit round robin using the token bucket, tokens are added to the queues 130 in intervals of a certain amount of time, and the queues 130 are sequentially provided with an opportunity to transmit the packets. Upon being provided with an opportunity to transmit the packets, during packet transmission, each queue 130 can transmit a number of packets corresponding to the number of possessed tokens all at once. All of the packets remaining in the queues 130 are transmitted, and if there are tokens that are left over, the tokens are transferred at the next transmission timing.

As shown in FIG. 3, for each queue 130, the scheduler 141 manages an ID that identifies the queue 130, a 5tuple hash value that identifies the communication flow, the current possessed token amount, a burst flag that identifies whether or not burst transmission is being performed, and a burst value indicating the amount of burst transmission that is being performed.

The burst request information of the packets extracted by the dequeue processing unit 140 is acquired by the header check unit 143. If a packet has the burst request information and the token amount is not negative, a number of tokens corresponding to the requested burst amount are added to the tokens of the queue within the range of the later-described burst amount upper limit value, and a number of packets corresponding to the number of tokens are transmitted at the current packet transmission timing. While there are tokens remaining, the processing of the header check unit 143 is not performed, and the packets are transmitted directly from the packet transmission unit 150 to the external apparatus. In a queue 130 that has been provided with tokens according to a burst request, normal tokens resulting from the elapse of time are not added, and after all of the tokens are used, the amount of tokens is subtracted based on the later-described number of flows, and addition of the tokens according to the elapse of time is resumed.

According to the above-described processing, the fairness with other communications can be maintained by disabling packet transmission for a certain period instead of allowing temporary burst transmission of packets.

In the example shown in FIG. 4, if the server 10 is to transmit many continuous packets, a burst request is added to the packets (step S101). In this case, the header check unit 143 checks whether or not there is a burst request (step S102), and a number of tokens corresponding to the burst value in the burst request are added (step S103). Accordingly, burst transmission is realized (step S104). Then, after the burst transmission, a number of tokens corresponding to the burst transmission amount are subtracted (step S105). Accordingly, the packet transmission and the burst request are disabled until the tokens become positive due to the normal chronological token addition processing.

Next, a method for determining an upper limit value of the burst amount will be described. If burst transmission with an extremely large flow is requested, queuing delay of the entire packet transfer apparatus 100 and worsening of jitter will be incurred, and therefore the maximum amount for which burst transmission is possible is determined according to the following procedure.

1. An active flow number $n_{flow}$ is measured by the flow number measurement unit 170 based on the enqueue and dequeue information acquired from the packet classification unit 120 and the dequeue processing unit 140. Specifically, by adding 1 to the count during allocation to a queue 130 and subtracting 1 from the count during dequeuing, the number of flows in which the count is not 0 is the number of active flows.

2. In the transmission rate measurement unit 160, the transmission packet rate $R_{out}$ is calculated by measuring the amount of packets that are to be transmitted from the packet transmission unit 150 in a predetermined period. Note that a link bandwidth on the transmission side and a maximum bandwidth set for each QoS class may also be set to $R_{out}$.

3. The burst amount calculation unit 180 acquires $n_{flow}$ and $R_{out}$, and calculates the burst amount upper limit value $B_{max}$ according to the following formula, where the target packet transmission interval $T_{target}$ is a constant.

$$B_{max} = \frac{T_{target} \times R_{out}}{n_{flow}} \quad \text{[Formula 1]}$$

This means that after the elapse of the $T_{target}$ time, the next transmission timing will come even if all of the active queues currently performing communication perform $B_{max}$ burst transmissions. For example, if the target packet transmission interval is 5 ms, the active flow number is 100, and the packet transmission rate is 10 Gbps, burst transmission is allowed up to 62.5 kB. Even if all 100 of the active flows sequentially perform 62.5-kB burst transmission, the next packet transmission timing will come 5 ms later.

In order to adapt to changes in the number of active flows and the transmission packet rate, the burst amount upper limit value $B_{max}$ is periodically updated.

Also, after the tokens added according to the burst requests are consumed, $\min(B_{max}, B_{demand}) \times (n_{flow}-1)$ tokens are subtracted from the requested burst amount $B_{demand}$. When the number of tokens is negative, only addition of tokens according to the elapse of time is performed, and therefore burst requests are ignored and packet transmission is also not performed. However, if no packets remain in any of the queues 130 and packet transmission is not performed, the token addition value may be increased, and packet transmission may be resumed in a short amount of time.

Figure 6:
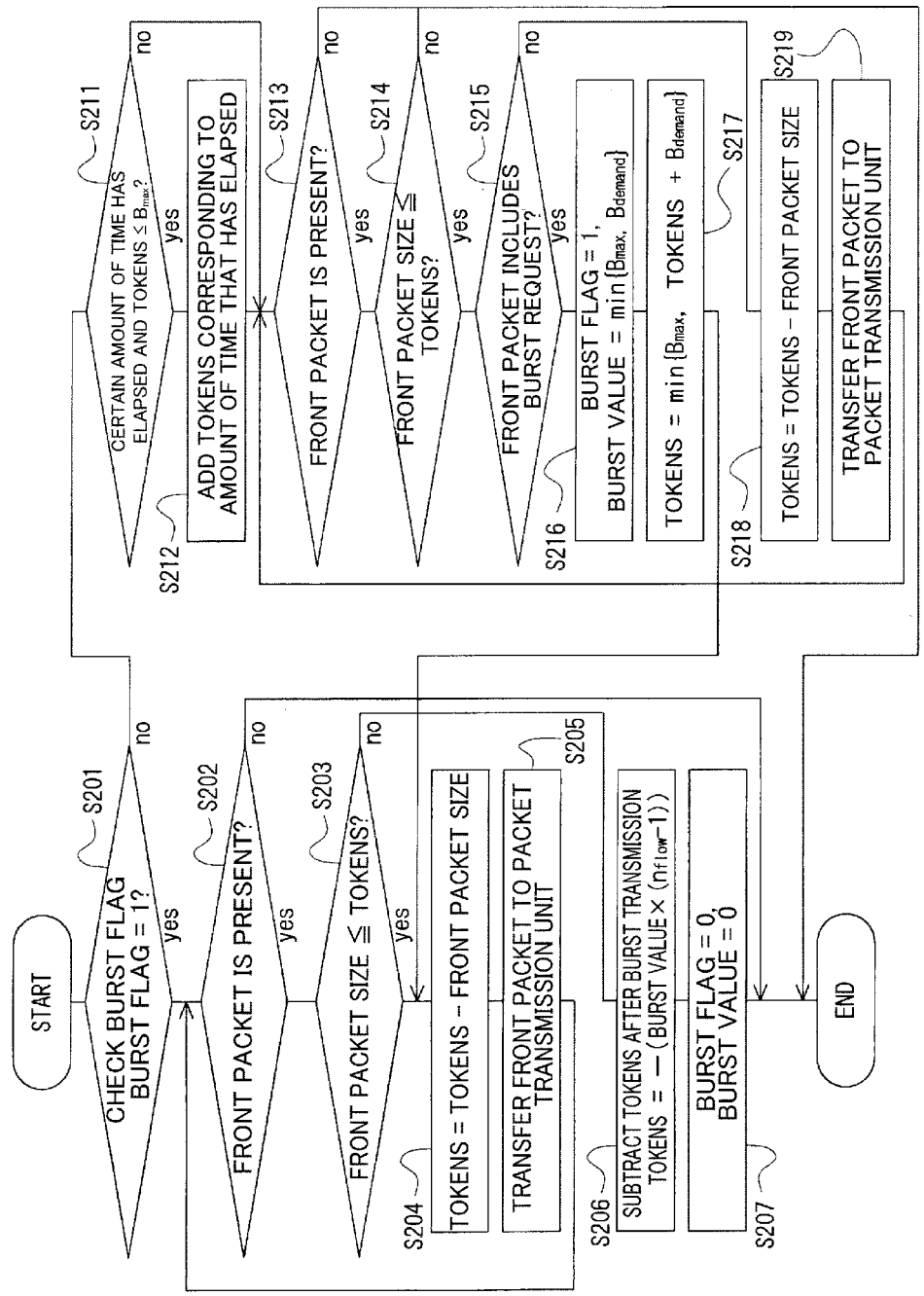
FIG. 6 shows an example of a flowchart for a packet processing algorithm of the dequeue processing unit.

An example of a detailed algorithm of the dequeue processing unit 140 is shown in FIG. 6. In FIG. 6, processing is performed for each queue.

As shown in FIG. 6, the dequeue processing unit 140 first; checks the burst flag of the target queue 130 (step S201). If the burst flag is 1, burst transmission processing is started. Specifically, if there is a packet at the front of the target queue 130 and the size of the packet at the front of the target queue 130 is less than or equal to the tokens (steps S202 and S203), the tokens are subtracted by the front packet size, and the front packet is transferred to the packet transmission unit 150 (steps S204 and S205). The burst transmission processing is repeatedly carried out until there are no more packets in the target queue 130 or until the size of the front packet is greater than the tokens.

When the burst transmission processing ends, an amount of tokens corresponding to the burst value$\times(n_{flow}-1)$ is subtracted, and the processing is ended by setting the burst flag and the burst value to 0 (steps S206 and S207).

On the other hand, if the burst flag is 0, processing conforming to a normal token bucket algorithm is performed. Specifically, if a certain amount of time has elapsed and the number of tokens is less than or equal to $B_{max}$, the tokens are increased by an amount corresponding to the elapsed time (steps S211 and S212). Then, if there is a packet at the front of the target queue 130 and the front packet size of the target queue 130 is less than or equal to the number of tokens (steps S213 and S214), the tokens are subtracted by the front packet size and the front packet is transferred to the packet transmission unit 150 (steps S213 and S219). The transmission processing is repeatedly carried out until there are no more packets in the target queue 130 or until the site of the front packet is greater than the tokens. However, if a burst request is included in the front packet of the target queue 130, the burst flag is set to 1, $\min\{B_{max}, B_{demand}\}$ is set as the burst value, the token is set to $\min\{B_{max}, \text{token}+ B_{demand}\}$, and a transition is made to the above-described burst processing (steps S215 to S217).

Next, a method for notifying the packet transfer apparatus 100 of a burst request will be described. Examples of burst request notification methods include a method of adding to a packet and a method of registering in the packet transfer apparatus 100 in advance.

Figure 7:
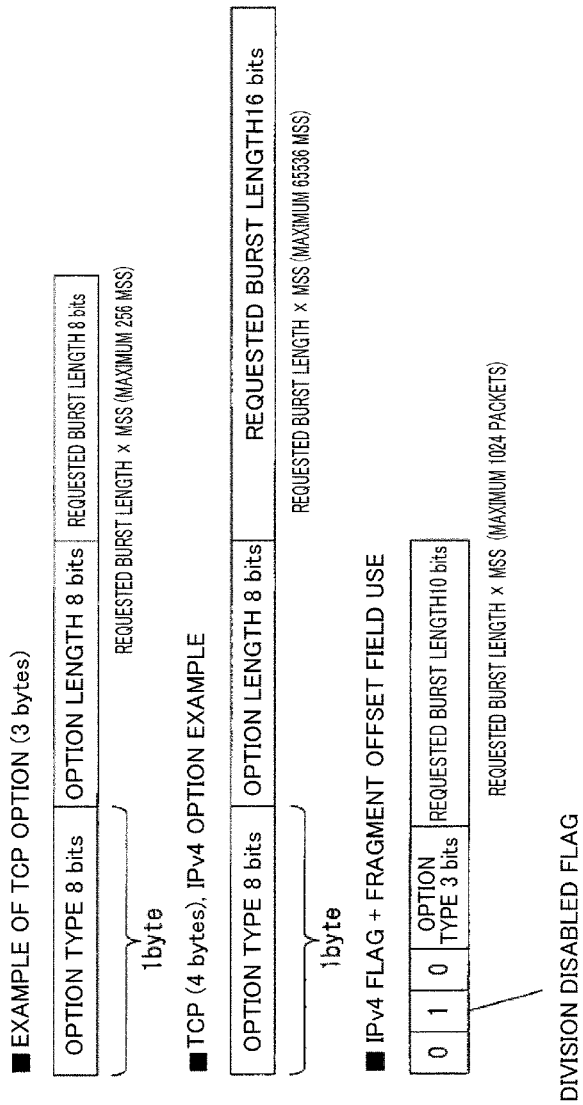
FIG. 7 shows an example in which a burst request is notified using a packet header.

A method of using an option region of an IP or TCP header is conceivable as a method of adding to a packet. If the region is in a closed network and fragmentation does not occur therein, it is also possible to use a flag or a fragment offset by setting the ID field of an IPv4 header or a DF bit. By directly adding the information to the packet, it is possible to flexibly change the requested burst length, but the information needs to be added in an application in units of packers. FIG. 7 shows an example of an option field of an IP or TCP header.

In the case of registering in the packet transfer apparatus 100 in advance, the method can be realized by notifying the packet transfer apparatus 100 of the burst transmission amount and the 5tuple hash value from the server 10 or the terminal 20 at the time of starting communication. In this case, although the burst transmission amount cannot be changed flexibly, there is no need to add the information in units of packets.

Figure 8:
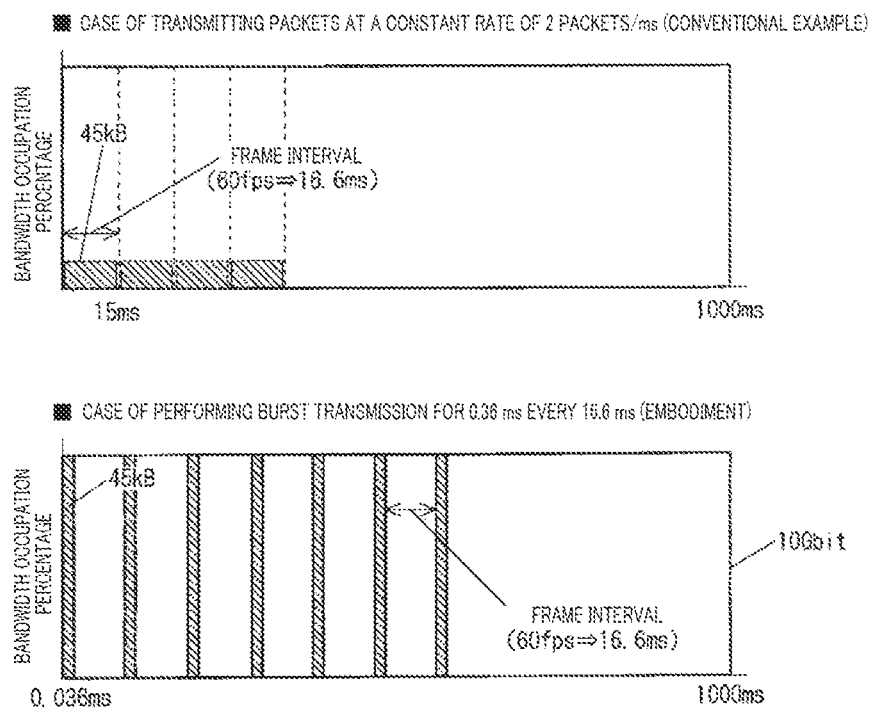
FIG. 8 shows an example of change over time in the network bandwidth occupation percentage due to packet transfer.

FIG. 8 shows an example of change over time in the percentage of network bandwidth occupied by packet transfer. As shown in FIG. 8, with the packet transfer apparatus 100 according to the present embodiment, by restricting packet transmission after performing instantaneous burst transmission, it is possible to transfer all of the data spanning over multiple packets, such as one frame of a real-time image, by reducing the queuing delay without hindering packet transmission of other communication. Also, according to the packet transfer apparatus 100, it is possible to reduce the maximum queuing delay and jitter resulting from burst transmission by calculating the maximum value of the amount of bursts that can be transmitted based on the packet transmission amount and the number of active flows.

Although an embodiment of the present invention was described above, there is no limitation thereto. For example, in the above-described embodiment, the communication flow was classified based on a 5tuple in the packet classification unit 120, but the present invention can be used in a method for packet processing in the same class, as well as in a method of classifying packets into multiple classes with different priority levels, a method of classifying packets into classes for network conditions such as delay, throughput, and packet loss, a method for classifying the packets into classes and then further classifying packets in a class into flows and classes, and the like.

Also, in the above-described embodiment, the scheduler 141 was based on scheduling based on a deficit round robin using a token bucket algorithm, but the present invention may also be applied to scheduling using a simple FIFO, bandwidth reservation for a specific class or flow, and priority control.

REFERENCE SIGNS LIST

10 Server
20 Terminal
100 Packet transfer apparatus
110 Packet reception unit
120 Packet classification unit
130 Queue
140 Dequeue processing unit
141 Scheduler
142 Packet extraction unit
143 Header check unit
150 Packet transmission unit
160 Transmission rate measurement unit
170 Flow number measurement unit
180 Burst amount calculation unit

The invention claimed is:

1. A packet transfer apparatus, including one or more computers for transmitting received packets to an external apparatus, the packet transfer apparatus including:
   a packet classification unit, implemented using one or more computing devices, configured to classify received packets that include a packet for a specific communication flow, the packet for the specific communication flow including information regarding a requested amount of data;
   a plurality of queues each configured to receive each classification of the classified packets; and
   a dequeue processing unit, implemented using one or more computing devices, configured to extract packets from the plurality of queues,
   wherein the dequeue processing unit is configured to:
      extract a packet from a first queue of the plurality of queues based on a token bucket algorithm,
      determine whether the extracted packet is for the specific communication flow, and
      control, based on a determination that the extracted packet is for the specific communication flow, a packet extraction amount extracted from the first queue for the specific communication flow according to the requested amount of data for the specific communication flow,
   wherein the amount of data is transmitted in packets.

2. The packet transfer apparatus according to claim 1, wherein the dequeue processing unit is configured to restrict the packet extraction amount in the specific communication flow based on the amount of data that was transmitted after the transmission of the packets performed through the control of the packet extraction amount.

3. The packet transfer apparatus according to claim 1, wherein the dequeue processing unit is configured to:
   calculate a maximum value of the amount of data that can be transmitted based on the amount of data that the packet transfer apparatus can transmit to an external apparatus and a number of communication flows using the packet transfer apparatus, and
   control the packet extraction amount extracted from the first queue in a range of the maximum value.

4. The packet transfer apparatus according to claim 1, wherein the dequeue processing unit is configured to:
   control the packet extraction amount extracted from the first queue for the specific communication flow by increasing the tokens based on the information regarding the requested amount of data.

5. The packet transfer apparatus according to claim 4, wherein after transmission performed through the control of the packet extraction amount, the dequeue processing unit is configured to restrict the packet extraction amount by reducing the tokens based on the amount of data that was transmitted.

6. The packet transfer apparatus according to claim 3, further comprising:
 a flow number measurement unit, implemented using one or more computing devices, configured to measure the number of communication flows;
 a transmission rate measurement unit, implemented using one or more computing devices, configured to measure a transmission packet rate calculated by measuring an amount of packets that are to be transmitted in a predetermined period; and
 an amount calculation unit, implemented using one or more computing devices, configured to acquire the measured number of communication flows and the transmission packet rate and calculate the maximum value by dividing (i) a value that is obtained by multiplying a target number with the transmission packet rate by (ii) the number of communication flows.

7. The packet transfer apparatus according to claim 6, wherein the target number is time for transmission.

8. A packet processing method of a packet transfer apparatus for transmitting received packets to an external apparatus, the packet transfer apparatus including a packet classification unit implemented using one or more computing devices, configured to classify received packets that include a packet for a specific communication flow, the packet for the specific communication flow including information regarding a requested amount of data, a plurality of queues each configured to receive each classification of the classified packets, and a dequeue processing unit, implemented using one or more computing devices, configured to extract packets from the plurality of queues, the packet processing method comprising:
 extracting a packet from a first queue of the plurality of queues based on a token bucket algorithm;
 determining whether the extracted packet is for the specific communication flow; and
 controlling, based on a determination that the extracted packet is for the specific communication flow, a packet extraction amount extracted from the first queue for the specific communication flow according to the requested based amount of data for the specific communication flow,
 wherein the amount of data is transmitted in packets.

9. The packet processing method according to claim 8, further comprising:
 restricting the packet extraction amount in the specific communication flow based on the amount of data that was transmitted after the transmission of the packets performed through the control of the packet extraction amount.

10. The packet processing method according to claim 8, further comprising:
 calculating a maximum value of the amount of data that can be transmitted based on the amount of data that the packet transfer apparatus can transmit to an external apparatus and a number of communication flows using the packet transfer apparatus; and
 controlling the packet extraction amount extracted from the first queue in a range of the maximum value.

11. The packet processing method according to claim 8, further comprising:
 controlling the packet extraction amount extracted from the first queue for the specific communication flow by increasing the tokens based on the information regarding the requested amount of data.

12. The packet processing method according to claim 11, wherein after transmission performed through the control of the packet extraction amount, the method further comprises restricting the packet extraction amount by reducing the tokens based on the amount of data that was transmitted.

13. The packet processing method according to claim 10, wherein calculating the maximum value comprises:
 measuring the number of communication flows;
 measuring a transmission packet rate calculated by measuring an amount of packets that are to be transmitted in a predetermined period;
 acquiring the measured number of communication flows and the transmission packet rate; and
 calculating the maximum value by dividing (i) a value that is obtained by multiplying a target number with the transmission packet rate by (ii) the number of communication flows,
 wherein the target number is time for transmission.

14. A non-transitory recording medium storing a program, wherein execution of the program causes one or more computers of a packet transfer apparatus to perform operations comprising:
 classifying received packets that include a packet for a specific communication flow, the packet for the specific communication flow including information regarding a requested amount of data;
 receiving, by each of a plurality of queues, each classification of the classified packets;
 extracting a packet from a first queue of the plurality of queues based on a token bucket algorithm;
 determining whether the extracted packet is for the specific communication flow; and
 controlling, based on a determination that the extracted packet is for the specific communication flow, a packet extraction amount extracted from the first queue for the specific communication flow according to the requested amount of data for the specific communication flow,
 wherein the amount of data is transmitted in packets.

15. The recording medium according to claim 14, wherein the operations further comprise:
 restricting the packet extraction amount in the specific communication flow based on the amount of data that was transmitted after the transmission of the packets performed through the control of the packet extraction amount.

16. The recording medium according to claim 14, wherein the operations further comprise:
 calculating a maximum value of the amount of data that can be transmitted based on the amount of data that the packet transfer apparatus can transmit to an external apparatus and a number of communication flows using the packet transfer apparatus; and
 controlling the packet extraction amount extracted from the first queue in a range of the maximum value.

17. The recording medium according to claim 14, wherein the operations further comprise:
 controlling the packet extraction amount extracted from the first queue for the specific communication flow by increasing the tokens based on the information regarding the requested amount of data.

18. The recording medium according to claim 17, wherein after transmission performed through the control of the packet extraction amount, the operations further comprise restricting the packet extraction amount by reducing the tokens based on the amount of data that was transmitted.

19. The recording medium according to claim 16, wherein calculating the maximum value comprises:
- measuring the number of communication flows;
- measuring a transmission packet rate calculated by measuring an amount of packets that are to be transmitted in a predetermined period;
- acquiring the measured number of communication flows and the transmission packet rate; and
- calculating the maximum value by dividing (i) a value that is obtained by multiplying a target number with the transmission packet rate by (ii) the number of communication flows.

20. The recording medium according to claim 19, wherein the target number is time for transmission.

\* \* \* \* \*